(12) United States Patent
Lee et al.

(10) Patent No.: US 7,947,752 B2
(45) Date of Patent: May 24, 2011

(54) METHOD OF PRODUCING MICROPOROUS HIGH DENSITY POLYETHYLENE FILM

(75) Inventors: Young Keun Lee, Daejeon (KR); Jang Weon Rhee, Daejeon (KR); Won Young Cho, Daejeon (KR); Jung Moon Sung, Seoul (KR); Byoung Cheon Jo, Daejeon (KR); Chol Ho Lee, Daejeon (KR); In Hwa Jung, Daejeon (KR); Byung Rae Jung, Daejeon (KR)

(73) Assignee: SK Energy Co., Ltd., Seoul (KR)

( * ) Notice: Subject to any disclaimer, the term of this patent is extended or adjusted under 35 U.S.C. 154(b) by 582 days.

(21) Appl. No.: 12/068,803

(22) Filed: Feb. 12, 2008

(65) Prior Publication Data

US 2008/0139681 A1 Jun. 12, 2008

Related U.S. Application Data

(62) Division of application No. 10/964,639, filed on Oct. 15, 2004, now Pat. No. 7,332,531.

(30) Foreign Application Priority Data

Jun. 11, 2004 (KR) .................. 10-2004-0043030
Sep. 14, 2004 (KR) .................. 10-2004-0073451

(51) Int. Cl.
*C08J 9/00* (2006.01)
*C08J 5/22* (2006.01)

(52) U.S. Cl. .............. 521/61; 521/62; 521/64; 521/143; 521/144; 521/83; 521/97

(58) Field of Classification Search .................. 521/61, 521/12, 143, 144, 62, 63, 83, 97, 142
See application file for complete search history.

(56) References Cited

U.S. PATENT DOCUMENTS

| | | | |
|---|---|---|---|
| 4,247,498 A | 1/1981 | Castro | |
| 4,325,850 A | 4/1982 | Mueller | |
| 4,335,193 A | 6/1982 | Doi et al. | |
| 4,539,256 A | 9/1985 | Shipman | |
| 4,588,633 A | 5/1986 | Kono et al. | |
| 4,778,601 A | 10/1988 | Lopatin et al. | |
| 4,873,034 A | 10/1989 | Kono et al. | |
| 4,877,679 A | 10/1989 | Leatherman et al. | |
| 5,015,521 A | 5/1991 | Fujii et al. | |
| 5,051,183 A | 9/1991 | Takita et al. | |
| 5,288,762 A | 2/1994 | Park et al. | |
| 5,411,351 A | 5/1995 | Lasch et al. | |
| 5,641,565 A | 6/1997 | Sogo | |
| 5,643,511 A | 7/1997 | Pluyter et al. | |
| 5,683,634 A | 11/1997 | Fujii et al. | |
| 5,759,678 A | 6/1998 | Fijii et al. | |
| 5,786,396 A | 7/1998 | Takita et al. | |
| 5,830,554 A | 11/1998 | Kaimai et al. | |
| 5,928,582 A | 7/1999 | Kenigsberg | |
| 6,096,213 A | 8/2000 | Radovanovic et al. | |
| 6,127,438 A | 10/2000 | Hasegawa et al. | |
| 6,245,272 B1 | 6/2001 | Takita et al. | |
| 6,566,012 B1 | 5/2003 | Takita et al. | |

FOREIGN PATENT DOCUMENTS

| | | | |
|---|---|---|---|
| JP | 01-167344 | | 7/1989 |
| JP | 03-245457 | | 11/1991 |
| JP | 06-212006 | | 8/1994 |
| JP | 06-234876 | | 8/1994 |
| JP | 7-118430 | | 5/1995 |
| JP | 09-003228 | | 1/1997 |
| JP | 09-259858 | | 10/1997 |
| JP | 11-060789 | * | 3/1999 |
| JP | 2000-17100 | | 1/2000 |
| JP | 2000-204188 | | 7/2000 |
| JP | 2002-338730 | | 11/2002 |
| JP | 2004-182763 | | 7/2004 |
| JP | 2004-196871 | | 7/2004 |

OTHER PUBLICATIONS

Encyclopedia of Polymer Science and Technology, "Antioxidants", J. Wiley & Sons, 2004, vol. 4, pp. 179-208.

* cited by examiner

*Primary Examiner* — Irina S Zemel
(74) *Attorney, Agent, or Firm* — Clark & Brody

(57) ABSTRACT

Disclosed is a microporous high density polyethylene film for a battery separator and a method of producing the same. The microporous high density polyethylene film includes high density polyethylene with a weight average molecular weight of $2 \times 10^5$-$5 \times 10^5$, containing 5 wt % or less molecule with a molecular weight of $1 \times 10^4$ or less. The microporous high density polyethylene film has tensile strengths of 1,100 kg/cm$^2$ or more in transverse and machine directions respectively, a puncture strength of 0.22 N/μm or more, a gas permeability (Darcy's permeability constant) of $1.3 \times 10^{-5}$ Darcy or more, and shrinkages of 5% or less in machine and transverse directions, respectively. Particularly, the microporous high density polyethylene film has an excellent extrusion-compoundabiliy and stretchability and a high productivity, and can improve the performances and stability of a battery produced using the same.

5 Claims, No Drawings

METHOD OF PRODUCING MICROPOROUS HIGH DENSITY POLYETHYLENE FILM

This is a divisional of U.S. application Ser. No. 10/964,639 filed Oct. 15, 2004, now U.S. Pat. No. 7,332,531, and is hereby incorporated by reference.

BACKGROUND OF THE INVENTION

1. Field of the Invention

The present invention relates to a microporous high density polyethylene film and a method of producing the same. More particularly, the present invention pertains to a microporous high density polyethylene film, which has a high productivity as well as a superior extrusion-compoundability and stretchability, and which can improve a performance and stability of a battery produced using the same, and a method of producing the same.

2. Description of the Prior Art

Having chemical stability and superior physical properties, a microporous polyolefin film is widely used as various battery separators, filters, and ultrafiltration membranes.

The production of the microporous film using polyolefin may be conducted according to the following three processes. In a first process, polyolefin is processed into a thin fiber to produce a nonwoven fabric-shaped microporous film, a second process is a dry process, in which a thick polyolefin film is prepared and stretched at low temperatures to create micro cracks between lamellas corresponding to a crystalline portion of polyolefin to form micro pores in polyolefin, and a third process is a wet process, in which polyolefin is compounded with a diluent at high temperatures to form a single phase, phase separation of polyolefin and diluent is initiated in a cooling step, and the diluent is extracted to form pores in polyolefin. In comparison with the first and second processes, the wet process, corresponding to the third process, produces a relatively thin microporous film with uniform thickness and excellent physical properties, and thus, the microporous film according to the wet process is widely used for an isolation membrane of a secondary battery, such as a lithium ion battery.

A method of producing a porous film according to a wet process is disclosed in U.S. Pat. No. 4,247,498, which comprises blending polyethylene and a compatible liquid with each other at high temperatures to form a thermodynamically homogeneous solution, and cooling the solution to initiate solid/liquid or liquid/liquid phase separation, thereby producing the porous polyolefin film.

U.S. Pat. No. 4,335,193 discloses a technology of producing a porous polyolefin film, which includes blending polyolefin, an organic liquid, such as dioctylphthalate and liquid paraffin, and inorganic filler; forming the blend; and removing the organic liquid and inorganic filler from the formed blend, which is also indicated by U.S. Pat. No. 5,641,565. However, the technology is disadvantageous in that the inorganic filler, such as silica, is used in compounding process, it is difficult to conduct feeding and compounding processes of the inorganic filler, and a subsequent process of extracting and removing the inorganic filler must be additionally conducted, and thus, the technology becomes very complicated and also it is difficult to increase a stretching ratio.

U.S. Pat. No. 4,539,256 recites a basic method of producing a microporous film, which includes extrusion molding a mixture of polyethylene and a compatible liquid, stretching the formed mixture, and extracting the compatible liquid from the stretched mixture.

In conjunction with the earnest use of a secondary battery, efforts have been continuously made to improve the productivity and physical properties of a microporous film. A representative example is to improve the strength of the microporous film by using ultra-high molecular weight polyolefin (UHMWPO) with a weight average molecular weight of about 1,000,000, or blending such a UHMWPO with a composition to increase a molecular weight of the composition.

With respect to this, U.S. Pat. Nos. 4,588,633 and 4,873,034 suggest a process of producing a microporous film, in which polyolefin with a weight average molecular weight of 500,000 or more and a diluent capable of dissolving polyolefin at high temperatures are subjected to two step solvent extraction and stretching steps. However, this process is disadvantageous in that in order to improve a poor compoundability of UHMWPO with the diluent and a poor extrudability of UHMWPO, which are considered as disadvantages of UHMWPO, an excessive amount of diluent is used in an extruding step, and the diluent must be extracted through two steps, before and after stretching.

U.S. Pat. No. 5,051,183 introduces a microporous polyolefin film, which includes a composition with a polydispersity index (weight average molecular weight/number average molecular weight) of 10-300, containing 10-50 wt % polyolefin having 1% or more UHMWPO with a weight average molecular weight of 700,000 or more, and 90-50 wt % solvent, such as a mineral oil. In this regard, the composition is extruded to form a gel-like sheet and stretched at a temperature range from a melting point of the composition to a temperature higher than the melting point by 10° C., and the solvent is then extracted from the composition, thereby forming the porous film. However, the above patent is disadvantageous in that a molecular weight distribution is broadened and the composition contains an excessive amount of polyolefin with a high molecular weight because the composition is blended with UHMWPO. In such a case, chain entanglement intensely occurs due to polyolefin molecules, leading to significantly reduced stretchability. In other words, a breakage phenomenon occurs at a high stretching ratio and speed, and a non-uniform stretching phenomenon caused by local incomplete stretching occurs at a low stretching ratio.

To avoid the above disadvantages, it is necessary to increase a stretching temperature to make the composition soft during a stretching process, or to reduce the stretching speed to gain the same effect as an increase of a temperature of the composition. In such a case, however, orientation of a resin is poor during the stretching process to lower a stretching effect, thereby reducing physical properties of the end porous film. Furthermore, a film made of the resin with a broad molecular weight distribution has more defects, caused by molecules with a relatively low molecular weight, than a film made of the resin with low molecular weight molecules, thus having reduced impact and puncture strengths. Like this, when the microporous film has the broad molecular weight distribution, the puncture strength, which is one of the most important physical properties of the microporous film, is poor. In other words, UHMWPO added into the microporous film does not contribute to improving the physical properties of the microporous film. The above disadvantages are also found in relating prior arts, for example, Japanese Pat. Laid-Open Publication Nos. Hei. 06-234876 and Hei. 06-212006, and U.S. Pat. No. 5,786,396.

Meanwhile, Japanese Pat. Laid-Open Publication No. Hei. 09-3228 suggests a method of improving physical properties of a microporous film by balancing stretching ratios in a machine direction (MD) and a transverse direction (TD) using the composition similar to that of the above patent.

Japanese Pat. Laid-Open Publication No. Hei. 09-259858 provides a method of producing a microporous polyethylene film, which comprises preparing a solution, including 10-80 wt % resin composition, containing 70-99 wt % polyethylene with a weight average molecular weight of 500,000 or more and 1-30 wt % low molecular weight polyethylene with a weight average molecular weight of 1,000-4,000, and 20-90 wt % solvent; extruding and cooling the solution using a die to form a gelatinized composition; stretching the gelatinized composition; and extracting the remaining solvent from the stretched composition, so as to reduce a shutdown temperature (at which the microporous film is molten to block pores to shut out an electric current, and thus ignition and explosion are prevented when a temperature of a battery increases due to an abnormal operation of the battery) of the microporous polyethylene film. In this respect, this method is characterized in that low molecular weight polyethylene with the weight average molecular weight of 1,000-4,000 is used to reduce the shutdown temperature of the microporous film. However, this method has two problems. First, use of a molecule with a low molecular weight brings about a reduction of the molecular weight and an increase of a molecular weight distribution, thereby reducing physical properties of the microporous polyethylene film. From examples of the patent, it can be seen that a tensile strength of the microporous polyethylene film is a relatively low 1,000-1,200 kg/cm$^2$. Second, a sophisticated technology is required to compound polyolefin and a diluent or solvent. In such a case, commercially, it is necessary to use a twin screw extruder, a kneader, a Banbury mixer and the like. As well, as described above, in case that resins having largely different viscosities from each other (ultra high molecular weight polyethylene with the weight average molecular weight of 500,000 or more and low molecular weight polyethylene with the weight average molecular weight of 1,000-4,000) are blended with the solvent, there are present problems in the course of compounding the resin and solvent, and in the course of compounding the two resins having the different molecular weights from each other (they have largely different viscosities from each other in a molten state). In such a case, fine gels or fish eyes may occur in the end film, thereby reducing a quality of the film. To avoid the fine gel or fish eye, there may be provided a method of increasing a residence time of a melt in an extruder, but the method has a disadvantage of the reduced productivity.

U.S. Pat. No. 5,830,554 recites a method of producing microporous polyolefin film, in which a solution, containing 5-50 wt % resin with a weight average molecular weight of 500,000-2,500,000 and a ratio of the weight average molecular weight to a number average molecular weight of 10 or less, is subjected to extruding, stretching, and extracting steps. According to the method, a large amount (preferably, 80-90 wt %) of solvent is used to avoid a problem regarding non-uniform extrusion caused by an increased viscosity of the resin in the course of extruding the ultra high molecular weight resin, and thus, a porosity is increased and a tensile strength of the porous film becomes 800 kg/cm$^2$ or more (in examples, 950-1,200 kg/cm$^2$), which means that the physical properties of the porous film are not significantly improved.

Furthermore, U.S. Pat. No. 6,566,012 discloses a method of producing a microporous polyolefin film usefully applied to a battery separator, in which 10-40 wt % ultra high molecular weight polyolefin with a weight average molecular weight of 500,000 or more, or 10-40 wt % a resin composition containing ultra high molecular weight polyolefin with a weight average molecular weight of 500,000 or more, and 90-60 wt % solvent are subjected to extruding, molding, stretching, extracting, and heat-setting steps.

As described above, the prior arts employ the resin with the high molecular weight to improve the physical properties of the porous film, but an increase of the molecular weight of the resin may bring about problems, such as an increased extrusion load, a poor extrusion-compoundability of the resin with the solvent, an increased load of a stretcher during a stretching process, occurrence of non-uniform, and a reduced productivity due to a decrease of a stretching speed and ratio.

The present inventors have conducted extensive studies to avoid the above disadvantages occurring in the prior arts, resulting in the finding that defects of polyethylene can be prevented from being formed by controlling contents of low molecular weight polyethylene molecules contained in polyethylene to a predetermined level or less, thereby accomplishing the present invention.

SUMMARY OF THE INVENTION

Therefore, the present invention has been made keeping in mind problems, caused by an increase of a molecular weight of a resin, occurring in the prior arts, and an object of the present invention is to provide a microporous high density polyethylene film with excellent physical properties and a uniform pore structure, which can be used as a microporous film for a battery use.

Another object of the present invention is to provide a method of economically producing a microporous high density polyethylene film with high productivity.

The above objects can be accomplished by providing a microporous high density polyethylene film, which comprises a composition, including 20-50 wt % high density polyethylene with a weight average molecular weight of $2 \times 10^5$-$5 \times 10^5$ (component I), containing 5 wt % or less molecule with a molecular weight of $1 \times 10^4$ or less; and 80-50 wt % diluent (component II). At this time, the microporous high density polyethylene film has tensile strengths of 1,100 kg/cm$^2$ or more in transverse and machine directions respectively, a puncture strength of 0.22 N/μm or more, a gas permeability (Darcy's permeability constant) of $1.3 \times 10^{-5}$ Darcy or more, and shrinkages of 5% or less in transverse and machine directions, respectively.

Furthermore, the present invention provides a method of producing a microporous high density polyethylene film, which includes (a) melt-extruding a composition, including 20-50 wt % high density polyethylene with a weight average molecular weight of $2 \times 10^5$-$5 \times 10^5$ (component I), containing 5 wt % or less molecule with a molecular weight of $1 \times 10^4$ or less, and 80-50 wt % diluent (component II), to form a sheet; (b) stretching the sheet at a temperature range, where 30-80 wt % of a crystalline portion of the sheet is molten, according to a tenter-type simultaneous stretching process such that stretching ratios are 3 times or more in machine and transverse directions, respectively and a total stretching ratio is 25-50 times to produce a film; (c) extracting the diluent from the film; and (d) heat-setting the resulting film at a temperature range where 10-30 wt % of a crystalline portion of the film is molten. In this regard, the microporous high density polyethylene film has tensile strengths of 1,100 kg/cm$^2$ or more in transverse and machine directions respectively, a puncture strength of 0.22 N/μm or more, a gas permeability (Darcy's permeability constant) of $1.3 \times 10^{-5}$ Darcy or more, and shrinkages of 5% or less in transverse and machine directions, respectively.

DETAILED DESCRIPTION OF THE INVENTION

Hereinafter, a detailed description will be given of the present invention.

According to the present invention, there are provided a microporous high density polyethylene film with excellent extrusion-compoundability and stretchability, which can overcome problems, caused by an increase of a molecular weight of a resin, and which can be used as a microporous film for a battery use, and a method of producing the same.

The method of producing the microporous polyethylene film using polyethylene according to the present invention is based on the following mechanism.

A low molecular weight organic material with a molecular structure similar to that of polyethylene (hereinafter, referred to as "diluent") forms a thermodynamically single phase in conjunction with polyethylene at high temperatures where polyethylene is molten. When a solution of polyethylene and diluent in the thermodynamically single phase state is cooled to room temperature, phase separation of polyethylene and diluent is initiated. In detail, the single phase is divided into a polyethylene rich phase mostly consisting of a lamella corresponding to a crystalline portion of polyethylene, and a diluent rich phase consisting of a small amount of polyethylene, dissolved in the diluent at room temperature, and the diluent. After the completion of the cooling, the diluent is extracted with an organic solvent to produce the microporous polyethylene film.

Accordingly, a basic structure of the microporous film depends on the process of the phase separation. In other words, a pore size and structure of the end microporous film depend on a size and a structure of the diluent rich phase formed through the phase separation. Additionally, the basic physical properties of the microporous film are influenced by a crystal structure of polyethylene formed in the course of extracting the diluent.

The present inventors have conducted extensive studies for a long time, resulting in the finding of the following facts. In other words, defects must not be formed in polyethylene in the course of extracting the diluent so as to produce the desired microporous film, which are most largely influenced by a low molecular weight polyethylene molecule contained in polyethylene.

Based on the above description, when the present inventors produced products using polyethylene containing a small amount of the low molecular weight molecule, the microporous polyethylene film with excellent physical properties and an uniform pore structure was produced and the processability of the microporous polyethylene film was significantly improved even though a resin with a smaller molecular weight than that in a conventional invention was used.

The method of producing the microporous high density polyethylene film according to the present invention comprises melt-extruding a composition, including 20-50 wt % high density polyethylene with a weight average molecular weight of $2 \times 10^5$-$5 \times 10^5$ (component I), containing 5 wt % or less molecule with a molecular weight of $1 \times 10^4$ or less, and 80-50 wt % diluent (component II), to form a sheet; stretching the sheet to produce a film; extracting the diluent from the film; and drying and heat-setting the resulting film. Particularly, the microporous high density polyethylene film of the present invention is characterized in that tensile strengths are each 1,100 kg/cm² or more in a transverse direction (TD) and a machine direction (MD), a puncture strength is 0.22 N/μm or more, a gas permeability (Darcy's permeability constant) is $1.3 \times 10^{-5}$ Darcy or more, and shrinkages are 5% or less in the TD and MD, respectively.

Typically, commercial polyethylene inevitably has a predetermined molecular weight distribution, and molecules with a molecular weight of thousands exist in polyethylene even with a weight average molecular weight more than $1 \times 10^6$. Since the low molecular weight molecules contribute to improving the processability of a high molecular weight resin in the case of applying polyethylene to a blown film and a blow molding process, which are typically considered as commercial application fields of polyethylene, the low molecular weight molecules are intentionally prepared in the course of producing polyethylene. However, in the course of producing the microporous polyethylene film, the low molecular weight molecules reduce perfection of the lamella corresponding to the crystalline portion of polyethylene in the polyethylene rich phase and reduce the number of tie molecules connecting the lamellas to each other, thereby reducing total strength of polyethylene. Further, since the low molecular weight molecules have a high compatibility to the diluent, they exist in a lot amount in the diluent rich phase, thus existing at interfaces between pores after the extraction, thereby enabling the interfaces between the pores to be unstable to reduce a porosity of microporous polyethylene film. This phenomenon is caused by the molecule with the molecular weight of $1 \times 10^4$ or less, and when its content is more than 5 wt %, the phenomenon strongly occurs.

Examples of a material of a conventional microporous polyolefin film include various kinds of polyethylene (low density polyethylene, linear low density polyethylene, medium density polyethylene, high density polyethylene and the like), and polypropylene. However, in the case of polyethylene except for high density polyethylene, and polypropylene, a structural regularity of polymer is reduced to reduce the perfection of the lamella corresponding to the crystalline portion of a resin and to make a thickness of the lamella thin. Furthermore, when a comonomer exists during a polymerization reaction, the reactivity of the comonomer is reduced in comparison with ethylene, thus producing the low molecular weight molecules in a lot amount.

Hence, high density polyethylene used in the present invention has a weight average molecular weight of $2 \times 10^5$-$5 \times 10^5$ and contains 5 wt % or less molecule with a molecular weight of $1 \times 10^4$ or less.

Additionally, it is preferable that high density polyethylene contains 2 wt % or less comonomer. Examples of the comonomer preferably include alpha olefins, such as propylene, butene-1, hexene-1,4-methylpentene-1, and octene-1, and more preferably, propylene, butene-1, hexene-1, and 4-methylpentene-1, which each has the relatively high reactivity.

Meanwhile, it is desirable to use high density polyethylene with the high molecular weight so as to enable the microporous film to have the excellent physical properties, but in the case of using high density polyethylene with the high molecular weight, a load of an extruder is increased due to an increase of a viscosity during an extruding process, a compoundability is reduced due to a large viscosity difference between polyethylene and diluent, and a surface of an extruded sheet becomes rough. In order to avoid the above disadvantages, an extruding temperature may be increased or a screw configuration of a twin screw compounder may be controlled so as to increase a shear rate, but such cases are problematic in that the resin is deteriorated, and thus, the physical properties of the resin are reduced.

As well, an increase of the molecular weight of the resin brings about increased entanglement of molecules to increase the strength of the sheet, thereby increasing a load during a stretching process to cause a slippage of a clip used in the course of setting the sheet. Additionally, since the strength of the sheet is increased, non-uniform stretching may occur at a low stretching ratio. However, the increased stretching ratio serves to increase shrinkage of the microporous film and a load of the clip of a stretcher, and thus, it is difficult to largely increase the stretching ratio. To avoid these disadvantages, a stretching temperature may be increased to make the sheet soft during the stretching process, or a stretching speed may be reduced to gain the same effect as an increase of a temperature of a composition. In such a case, however, orientation of the resin is poor during the stretching process to lower a stretching effect, thereby reducing the physical properties of the end microporous film. Further, a decrease of the stretching speed functions to undesirably reduce the productivity.

With respect to this, the present inventors found that when high density polyethylene contains a sufficiently small amount of low molecular weight molecules, in detail, 5 wt % or less molecules with the molecular weight of $1\times10^4$ or less, high density polyethylene has the physical properties enough to be applied to a battery separator even though high density polyethylene has the weight average molecular weight of $5\times10^5$ or less. In this regard, since high density polyethylene with the weight average molecular weight less than $2\times10^5$ has the undesirable physical properties, high density polyethylene used in the present invention has the weight average molecular weight of $2\times10^5$-$5\times10^5$. High density polyethylene with the desired molecular weight and molecular weight distribution has the excellent stretchability, and thus, it has an excellent pore structure at the low stretching ratio in the stretching process, and the load of the clip used in the stretching process is low, thereby easily conducting the stretching process, bringing about the improved productivity.

Any organic liquid capable of forming the single phase in conjunction with the resin at an extrusion-molding temperature may be used as the diluent of the present invention. Examples of the diluent include aliphatic or cyclic hydrocarbon, such as nonane, decane, decalin, and paraffin oil, and phthalic acid ester, such as dibutyl phthalate and dioctyl phthalate. Of them, paraffin oil, which is harmless to humans, has a high boiling point, and contains a small amount of volatile components, is preferable, and paraffin oil with a kinetic viscosity of 20-200 cSt at 40° C. is more preferable. When the kinetic viscosity of paraffin oil is more than 200 cSt, there may occur problems, such as the increased load and inferior surfaces of the sheet and film, because of the high kinetic viscosity in the extruding process, and since it is difficult to conduct the extraction process, the productivity may be reduced and the gas permeability may be reduced due to the remaining oil. On the other hand, when the kinetic viscosity of paraffin oil is less than 20 cSt, it is difficult to conduct compounding of paraffin oil with polyethylene melt in the extruder during the extrusion process because of a large viscosity difference between paraffin oil and polyethylene melt.

As for contents of high density polyethylene and diluent, it is preferable that the contents of high density polyethylene and diluent are 20-50 wt % and 80-50 wt %, respectively. When the content of high density polyethylene is more than 50 wt % (i.e. when the content of diluent is less than 50 wt %), the porosity and pore size are reduced, thereby largely reducing the gas permeability. On the other hand, when the content of high density polyethylene is less than 20 wt % (i.e. when the content of diluent is more than 80 wt %), the compoundability of polyethylene with diluent is reduced, and thus, polyethylene is not thermodynamically blended with the diluent but extruded in a gel state, bringing about problems, such as a breakage and a thickness nonuniformity during the stretching process.

Additives, such as an oxidation stabilizer, an UV stabilizer, and an antistatic agent, may be further added to the composition so as to improve specific functions of the composition.

The composition is melt-extruded using a twin screw compounder, a kneader, or a Banbury mixer, designed so as to be used to mix polyethylene with the diluent, to produce the sheet. Polyethylene and paraffin oil may be fed into the compounder after they are previously blended with each other, or may be fed into the compounder through separate feeders. Both casting and calendaring processes may be applied to produce the sheet using a melt.

It is preferable that the stretching process is conducted in a tenter-type simultaneous stretching manner. If the stretching process is conducted in a roll-type stretching manner, defects, such as scratches, may be formed on a surface of the sheet during the stretching process. At this time, it is preferable that the stretching ratios are 3 times or more in machine and transverse directions, respectively and a total stretching ratio is 25-50 times. When the stretching ratio is less than 3 times in any direction, orientation is poor in such direction and a balance between physical properties in the machine and transverse directions is upset, and thus, the tensile and puncture strengths are reduced. Additionally, when the total stretching ratio is less than 25 times, non-uniform stretching occurs, and when the total stretching ratio is more than 50 times, a breakage may occur during the stretching process and the shrinkage of the end film is undesirably increased.

In this respect, the stretching temperature depends on a melting point of polyethylene, a concentration and a kind of the diluent. The optimum stretching temperature is preferably selected from a temperature range where 30-80 wt % of the crystalline portion of polyethylene in the sheet is molten. When the stretching temperature is lower than a temperature where 30 wt % of the crystalline portion of polyethylene in the film sheet is molten, softness of the film is poor to have the enough stretchability of the film, and thus, there is a fair possibility of the breakage during the stretching process and the non-uniform stretching also simultaneously occurs. On the other hand, when the stretching temperature is higher than a temperature where 80 wt % of the crystalline portion is molten, the stretching process is easily conducted and the occurrence of the non-uniform stretching is reduced, but the deviation of thickness occurs due to a partial over-stretching and the physical properties of the film are significantly reduced because an orientation effect of the resin is low. Meanwhile, the melting of the crystalline portion of polyethylene according to the stretching temperature may be evaluated by a differential scanning calorimeter (DSC) analysis for the film.

The stretched film is extracted with the organic solvent and dried. Non-limiting, illustrative examples of the available organic solvent of the present invention may include any solvent capable of extracting the diluent used to extrude the resin, and preferably, methyl ethyl ketone, methylene chloride, and hexane, which have a high extraction efficiency and are rapidly dried. The extraction may be conducted according to a typical solvent extracting process, in detail, any one process or a combination of immersion, solvent spray, and ultrasonic processes. The amount of the remaining diluent must be 1 wt % or less after the extraction process. When the amount of the remaining diluent is more than 1 wt %, the physical properties and the gas permeability of the film are reduced.

The amount of the remaining diluent largely depends on an extraction temperature and time. It is preferable that the extraction temperature is high so as to increase the solubility of the diluent in solvent, but it is preferable to limit the extraction temperature to 40° C. or lower in consideration of safety regarding the boiling of the solvent. When the extraction temperature is below a solidifying point of the diluent, the extraction efficiency is significantly reduced, and thus, the extraction temperature must be higher than the solidifying point of the diluent. The extraction time depends on a thickness of the film and is preferably 2-4 min in the case of producing the typical microporous film with the thickness of 10-30 μm.

The dried film is heat-set to remove a residual stress and thus to reduce the shrinkage of the end film. According to a heat-setting process, the film is set and then heated to forcibly maintain an original shape of the film, to be shrunken, to remove the remaining stress. It is desirable that a heat-setting temperature is high in order to reduce the shrinkage of the film, but when the heat-setting temperature is very high, a portion of the film is molten to block micro pores, thereby reducing the gas permeability. The desirable heat-setting temperature is selected from a temperature range where 10-30 wt % of the crystalline portion of the film is molten. When the heat-setting temperature is lower than a temperature where 10 wt % of the crystalline portion of the film is molten, reorientation of polyethylene molecules in the film is poor, and thus, residual stress removal efficiency from the film is trivial, and when the heat-setting temperature is higher than a temperature where 30 wt % of the crystalline portion of the film is molten, the film is partially molten to block the micro pores, and thus the gas permeability is reduced.

In this regard, a heat-setting time is relatively short in case that the heat-setting temperature is high, but relatively long in case that the heat-setting temperature is low. Preferably, the heat-setting time is 1-20 min. More preferably, the heat-setting time is 5-20 min at a temperature range where 10-20 wt % of the crystalline portion of the film is molten, and 1-5 min at a temperature range where 20-30 wt % of the crystalline portion of the film is molten.

The microporous high density polyethylene film produced according to the present invention has the following physical properties.

(1) The tensile strengths are 1,100 kg/cm$^2$ or more in transverse and machine directions, respectively.

When the tensile strength is less than 1,100 kg/cm$^2$, the microporous film may be broken in use. Particularly, in case that the microporous film is applied to the battery separator, the microporous film may be broken by a tension in the course of rapidly assembling of the battery. Since the microporous high density polyethylene film of the present invention has the tensile strength of 1,100 kg/cm$^2$ or more, the microporous film can be prevented from being broken in the course of battery assembling.

(2) The puncture strength is 0.22 N/μm or more.

When the microporous film is applied to the battery separator, if the microporous film has the insufficient puncture strength, defined as the strength of the film against a sharp substance, the film may be torn due to an abnormal surface state of electrodes or dendrites formed on surfaces of the electrodes in use of the battery, and thus, a short may occur. When a break point is 350 g or less, a commercial battery separator is problematic in that safety is reduced due to the occurrence of the short. Among films for the general commercial battery separator, the film with the puncture strength of 0.22 N/μm or more according to the present invention is the thinnest 16 μm, and has the break point of 350 g or more in use, thus safely being applied to many fields.

(3) The gas permeability (Darcy's permeability constant) is 1.3×10$^{-5}$ Darcy or more.

When the gas permeability is 1.3×10$^{-5}$ Darcy or less, efficiency of the microporous film is significantly reduced. Particularly, when the gas permeability is less than 1.3×10$^{-5}$ Darcy, in case that the microporous film is applied to the battery separator, charging and discharging characteristics of the battery are poor and a life of the battery is reduced. However, the film with the gas permeability of 1.3×10$^{-5}$ Darcy or more according to the present invention gives the battery the excellent charging and discharging characteristics and low temperature characteristics, and serves to improve the life of the battery.

(4) The shrinkages are 5% or less in transverse and machine directions, respectively.

The shrinkage is measured after the film is left at 105° C. for 10 min, and when the shrinkage is high, the film cannot be used at high temperatures. Particularly, in the case of the battery separator, when the shrinkage is more than 5%, since the battery separator is shrunken by heat generated from the battery itself, the electrodes may come into contact with each other to bring about the short. The film of the present invention has shrinkages of 5% or less in transverse and machine directions respectively, thus being safely applied to the battery separator.

In addition to the above physical properties, the microporous high density polyethylene film of the present invention has excellent extrusion-compoundability and stretchability.

Having generally described this invention, a further understanding can be obtained by reference to certain specific examples and comparative examples which are provided herein for purposes of illustration only and are not intended to be limiting unless otherwise specified.

A molecular weight and a molecular weight distribution of polyethylene were measured using a high temperature gel permeation chromatography (GPC), manufactured by Polymer Laboratory Inc.

A viscosity of a diluent was measured using CAV-4 automatic viscometer, manufactured by Cannon Instrument Co.

Polyethylene and the diluent were compounded with each other using a twin screw compounder in which Φ is 30 mm. An extrusion temperature was 160-240° C., and a residence time was 3 min. A melt extruded using a T-shaped die is shaped into a sheet with a thickness of 600-1200 μm using a casting roll, and then stretched. A film with a thickness of 200 μm was additionally produced and the number of gels in the film with an area of 2000 cm$^2$ was counted to determine whether the gels, caused by poor melting and compounding, exist or not in the film. The number of the gels must be 50 or less per 2000 cm$^2$ to prevent a quality of the microporous film from being reduced.

The sheet was analyzed using a DSC to evaluate the melting of a crystalline portion thereof with a variation of a temperature. Analysis conditions included a sample weight of 5 mg and a scanning rate of 10° C./min.

A stretching process of the sheet was conducted in a simultaneous stretching manner using a tenter-type lab stretcher while a stretching ratio, temperature, and speed were varied, and a stretching temperature was determined at a temperature range where 30-80 wt % of a crystalline portion of polyethylene in the film was molten based on the analysis results of the DSC. The five sheets were stretched to evaluate a stretching success rate, which means that no slippage occurs at a clip and no breakage occurs during the stretching process.

The extraction of the diluent was conducted with methylene chloride in an immersion process.

After the film, from which the diluent was extracted, was dried under atmospheric air, the dried film was set to a frame and then left in a convection oven while varying a temperature and a time, thereby completing a heat-setting process.

The tensile strength, puncture strength, gas permeability, and shrinkage, which are considered as the most important physical properties of the microporous film, of the resulting film were measured, and the results are described in Table 1.

※ Measurement of the physical properties (1) The tensile strength was measured according to ASTM D882.

(2) The puncture strength was determined by measuring strength of the film when the film was punctured by a pin with a diameter of 0.5 mm moving at a speed of 120 mm/min (3) The gas permeability was measured using a porometer (CFP-1500-AEL manufactured by PMI Co. Ltd.). Conventionally, the gas permeability was expressed by a Gurley number, but since an effect of a thickness of the film was not reflected in the Gurley number, it was difficult to gain a relative permeability to a pore structure of the film. To avoid the above disadvantage, in the present invention, a Darcy's permeability constant was used. The Darcy's permeability constant was calculated by the following Equation 1, and nitrogen was used as gas in the present invention.

$$C=(8FTV)/(\pi D^2(P^2-1))$$  Equation 1 wherein, C is the Darcy's permeability constant, F is a flow rate, T is a sample thickness, V is a viscosity of the gas (0.185 for $N_2$), D is a sample diameter, and P is pressure.

An average value of Darcy's permeability constants at a range of 100-200 psi was used in the present invention.

(4) The shrinkage was gained by measuring each shrinkage in both machine and transverse directions after the film was left at 105° C. for 10 min, and expressed in a percentage.

Example 1

High density polyethylene with a weight average molecular weight of $3 \times 10^5$, containing 4.2 wt % molecule with a molecular weight of $1 \times 10^4$ or less and no comonomer, was used as a component I, and a paraffin oil with a kinetic viscosity of 95 cSt at 40° C. was used as a component II. Contents of the components I and II were 30 wt % and 70 wt %, respectively.

A stretching process was conducted under conditions of at a temperature of 115° C. where 30 wt % of a crystalline portion of polyethylene was molten, a stretching ratio of 36 times (MD×TD=6×6), and a stretching speed of 2 m/min. A film, from which a diluent was extracted, was dried under atmospheric air and then set to a frame to be heat-set at 120° C., where 20 wt % of a crystalline portion of the film was molten, for 15 min. The resulting film was 20±2 µm in thickness.

Example 2

The procedure of example 1 was repeated except that high density polyethylene with a weight average molecular weight of $4 \times 10^5$, containing 3.9 wt % molecule with a molecular weight of $1 \times 10^4$ or less and 0.5 wt % butene-1 as a comonomer, was used as a component I. Like the case of example 1, a stretching temperature was adjusted to 114.5° C. so that 30 wt % of a crystalline portion of polyethylene was molten in a stretching process. Additionally, a heat-setting temperature was adjusted to 119° C. so that 20 wt % of a crystalline portion of a film was molten like in example 1.

Example 3

The procedure of example 1 was repeated except that high density polyethylene with a weight average molecular weight of $4.7 \times 10^5$, containing 1.2 wt % molecule with a molecular weight of $1 \times 10^4$ or less and no comonomer, was used as a component I, and that a stretching process was conducted at 117° C. where 40 wt % of a crystalline portion of polyethylene was molten.

Example 4

The procedure of example 1 was repeated except that high density polyethylene with a weight average molecular weight of $3.5 \times 10^5$, containing 4.5 wt % molecule with a molecular weight of $1 \times 1$ or less and 1.5 wt % butene-1 as a comonomer, was used as a component I, a paraffin oil with a kinetic viscosity of 70 cSt at 40° C. was used as a component II, and contents of the components I and II were 40 wt % and 60 wt %, respectively. Like the case of example 1, a stretching temperature was adjusted to 116° C. so that 30 wt % of a crystalline portion of polyethylene was molten in a stretching process, and a heat-setting temperature was adjusted to 118° C. so that 20 wt % of a crystalline portion of a film was molten like in example 1.

Example 5

High density polyethylene with a weight average molecular weight of $4.7 \times 10^5$, containing 1.2 wt % molecule with a molecular weight of $1 \times 10^4$ or less and no comonomer, was used as a component I like in example 3, and a paraffin oil with a kinetic viscosity of 120 cSt at 40° C. was used as a component II. Contents of the components I and II were 40 wt % and 60 wt %, respectively. A stretching process was conducted under conditions of at a temperature of 117° C. where 30 wt % of a crystalline portion of polyethylene was molten, a stretching ratio of 36 times (MD×TD=6×6), and a stretching speed of 2 m/min. A heat-setting process was carried out at 115° C., where 10 wt % of a crystalline portion of a film was molten, for 15 min.

Example 6

High density polyethylene with a weight average molecular weight of $4.7 \times 10^5$, containing 1.2 wt % molecule with a molecular weight of $1 \times 10$ or less and no comonomer, was used as a component I like in example 3, and a paraffin oil with a kinetic viscosity of 30 cSt at 40° C. was used as a component II. Contents of the components I and II were 20 wt % and 80 wt %, respectively. A stretching process was conducted under conditions of at a temperature of 113° C. where 30 wt % of a crystalline portion of polyethylene was molten, a stretching ratio of 49 times (MD×TD=7×7), and a stretching speed of 2 m/min. A heat-setting process was carried out at 120° C., where 20 wt % of a crystalline portion of a film was molten, for 5 min.

Example 7

The procedure of example 3 was repeated except that a stretching temperature was 122° C. where 60 wt % of a crystalline portion of polyethylene was molten, and that a stretching ratio was 25 times (MD×TD=5×5).

Example 8

High density polyethylene with a weight average molecular weight of $3.5 \times 10^5$, containing 4.5 wt % molecule with a molecular weight of $1 \times 10^4$ or less and 1.5 wt % butene-1 as a comonomer, was used as a component I like in example 4, and a paraffin oil with a kinetic viscosity of 160 cSt at 40° C. was used as a component II. Contents of the components I and II were 30 wt % and 70 wt %, respectively. A stretching process was conducted under conditions of at a temperature of 120° C. where 50 wt % of a crystalline portion of polyethylene was molten, a stretching ratio of 25 times (MD×TD=5×5), and a stretching speed of 2 m/min. A heat-setting process was carried out at 118° C., where 20 wt % of a crystalline portion of a film was molten, for 15 min.

Example 9

Components I and II were the same as those of example 3. Contents of the components I and II were 50 wt % and 50 wt %, respectively. A stretching process was conducted under conditions of at a temperature of 119° C. where 30 wt % of a crystalline portion of polyethylene was molten, a stretching ratio of 36 times (MD×TD=6×6), and a stretching speed of 10 m/min. A heat-setting process was carried out at 123° C., where 30 wt % of a crystalline portion of a film was molten, for 5 min.

Example 10

High density polyethylene with a weight average molecular weight of $3.5 \times 10^5$, containing 4.5 wt % molecule with a molecular weight of $1 \times 10^4$ or less and 1.5 wt % butene-1 as a comonomer, was used as a component I like in example 4, and a paraffin oil with a kinetic viscosity of 95 cSt at 40° C. was used as a component II. Contents of the components I and II were 20 wt % and 80 wt %, respectively. A stretching process was conducted under conditions of at a temperature of 112° C. where 30 wt % of a crystalline portion of polyethylene was molten, a stretching ratio of 36 times (MD×TD=6×6), and a stretching speed of 2 m/min. A heat-setting process was carried out at 119° C., where 25 wt % of a crystalline portion of a film was molten, for 15 min.

Example 11

Components I and II were the same as those of example 3, and their contents were the same as those of example 3. A stretching process was conducted under conditions of at a temperature of 115° C. where 30 wt % of a crystalline portion of polyethylene was molten, a stretching ratio of 49 times (MD×TD=7×7), and a stretching speed of 2 m/min. A heat-setting process was carried out at 115° C., where 10 wt % of a crystalline portion of a film was molten, for 20 min.

Comparative Example 1

The procedure of example 1 was repeated except that high density polyethylene with a weight average molecular weight of $1.8 \times 10^5$, containing 22 wt % molecule with a molecular weight of $1 \times 10^4$ or less and 0.5 wt % butene-1 as a comonomer, was used as a component I. Like the case of example 1, a stretching temperature was adjusted to 114.5° C. so that 30 wt % of a crystalline portion of polyethylene was molten in a stretching process, and a heat-setting temperature was adjusted to 119° C. so that 20 wt % of a crystalline portion of a film was molten like in example 1.

Comparative Example 2

The procedure of example 1 was repeated except that high density polyethylene with a weight average molecular weight of $2.1 \times 10^5$, containing 15 wt % molecule with a molecular weight of $1 \times 10^4$ or less and 1.5 wt % butene-1 as a comonomer, was used as a component I. Like the case of example 1, a stretching temperature was adjusted to 114° C. so that 30 wt % of a crystalline portion of polyethylene was molten in a stretching process, and a heat-setting temperature was adjusted to 118° C. so that 20 wt % of a crystalline portion of a film was molten like in example 1.

Comparative Example 3

The procedure of example 1 was repeated except that high density polyethylene with a weight average molecular weight of $5.7 \times 10^5$, containing 9 wt % molecule with a molecular weight of $1 \times 10^4$ or less and 0.8 wt % butene-1 as a comonomer, was used as a component I. Like the case of example 1, a stretching temperature was adjusted to 114.5° C. so that 30 wt % of a crystalline portion of polyethylene was molten in a stretching process, and a heat-setting temperature was adjusted to 119° C. so that 20 wt % of a crystalline portion of a film was molten like in example 1.

Comparative Example 4

The procedure of example 3 was repeated except that contents of the components I and II were 60 wt % and 40 wt %, respectively, and that a stretching temperature was 120° C. where 30 wt % of a crystalline portion of polyethylene was molten in a stretching process.

Comparative Example 5

The procedure of comparative example 4 was repeated except that contents of the components I and II were 13 wt % and 87 wt %, respectively. A stretching temperature was adjusted to 112° C. so that 30 wt % of a crystalline portion of polyethylene was molten in a stretching process.

Comparative Example 6

The procedure of example 3 was repeated except that a stretching temperature was 110° C. where 5 wt % of a crystalline portion of polyethylene was molten.

Comparative Example 7

The procedure of example 3 was repeated except that a stretching temperature was 125° C. where 85 wt % of a crystalline portion of polyethylene was molten.

Comparative Example 8

The procedure of example 1 was repeated except that high density polyethylene with a weight average molecular weight of $5.1 \times 10^5$, containing 9.4 wt % molecule with a molecular weight of $1 \times 10^4$ or less and no comonomer, was used as a component I and a stretching ratio was 16 times (MD×TD=4×4).

Comparative Example 9

The procedure of example 1 was repeated except that high density polyethylene with a weight average molecular weight of $5.1\times10^5$, containing 9.4 wt % molecule with a molecular weight of $1\times10^4$ or less and no comonomer, was used as a component I and a stretching ratio was 56.25 times (MD× TD=7.5×7.5).

Comparative Example 10

The procedure of example 3 was repeated except that a heat-setting process was conducted at 127° C., where 35 wt % of a crystalline portion of a film was molten, for 15 min.

Production conditions and the results of the above examples and comparative examples are described in the following Tables 1-4.

TABLE 1

| Production condition | | Unit | Examples | | | | | |
|---|---|---|---|---|---|---|---|---|
| | | | 1 | 2 | 3 | 4 | 5 | 6 |
| High density polyethylene (component I) | Mw | g/mol | $3\times10^5$ | $4\times10^5$ | $4.7\times10^5$ | $3.5\times10^5$ | $4.7\times10^5$ | $4.7\times10^5$ |
| | Mw $\leq 10^4$ | wt % | 4.2 | 3.9 | 1.2 | 4.5 | 1.2 | 1.2 |
| | Comonomer | wt % | 0 | 0.5 | 0 | 1.5 | 0 | 0 |
| | Content | wt % | 30 | 30 | 30 | 40 | 40 | 20 |
| Paraffin oil (component II) | Viscosity(40° C.) | cSt | 95 | 95 | 95 | 70 | 120 | 30 |
| | Content | wt % | 70 | 70 | 70 | 60 | 60 | 80 |
| Stretching | Temperature | ° C. | 115 | 114.5 | 117 | 116 | 117 | 113 |
| | Melting of a crystalline portion | wt % | 30 | 30 | 40 | 30 | 30 | 30 |
| | Ratio (MD × TD) | Times | 6 × 6 | 6 × 6 | 6 × 6 | 6 × 6 | 6 × 6 | 7 × 7 |
| | Speed | m/min | 2 | 2 | 2 | 2 | 2 | 2 |
| Heat-setting | Temperature | ° C. | 120 | 119 | 120 | 118 | 115 | 120 |
| | Melting of a crystalline portion | wt % | 20 | 20 | 20 | 20 | 10 | 20 |
| | Time | min | 15 | 15 | 15 | 15 | 15 | 5 |
| The number of gels in a sheet | | #/2000 cm² | 5 | 15 | 17 | 14 | 12 | 25 |
| Stretching success rate | | % | 100 | 100 | 100 | 100 | 100 | 100 |
| Tensile strength | MD | kg/cm² | 1340 | 1450 | 1400 | 1520 | 1630 | 1550 |
| | TD | kg/cm² | 1200 | 1300 | 1350 | 1420 | 1520 | 1470 |
| Thickness of a film | | μm | 22 | 20 | 20 | 18 | 20 | 19 |
| Puncture strength | | N/μm | 0.22 | 0.24 | 0.28 | 0.26 | 0.29 | 0.27 |
| Gas permeability | | $10^{-5}\times$ Darcy | 1.7 | 1.7 | 1.8 | 1.6 | 1.6 | 1.9 |
| Shrinkage | MD | % | 3.1 | 3 | 3.1 | 3.3 | 4.5 | 4.5 |
| | TD | % | 1.3 | 1.6 | 2.3 | 2.9 | 3.5 | 3.9 |

TABLE 2

| Production condition | | Unit | Examples | | | | |
|---|---|---|---|---|---|---|---|
| | | | 7 | 8 | 9 | 10 | 11 |
| High density polyethylene (component I) | Mw | g/mol | $4.7\times10^5$ | $3.5\times10^5$ | $4.7\times10^5$ | $3.5\times10^5$ | $4.7\times10^5$ |
| | Mw $\leq 10^4$ | wt % | 1.2 | 4.5 | 1.2 | 4.5 | 1.2 |
| | Comonomer | wt % | 0 | 1.5 | 0 | 1.5 | 0 |
| | Content | wt % | 30 | 30 | 50 | 20 | 30 |
| Paraffin oil (component II) | Viscosity(40° C.) | cSt | 95 | 160 | 95 | 95 | 95 |
| | Content | wt % | 70 | 70 | 50 | 80 | 70 |
| Stretching | Temperature | ° C. | 122 | 120 | 119 | 112 | 115 |
| | Melting of a crystalline portion | wt % | 60 | 50 | 30 | 30 | 30 |
| | Ratio(MD × TD) | Times | 5 × 5 | 5 × 5 | 6 × 6 | 6 × 6 | 7 × 7 |
| | Speed | m/min | 2 | 2 | 10 | 2 | 2 |
| Heat-setting | Temperature | ° C. | 120 | 118 | 123 | 119 | 115 |
| | Melting of a crystalline portion | wt % | 20 | 20 | 30 | 25 | 10 |
| | Time | Min | 15 | 15 | 5 | 15 | 20 |
| The number of gels in a sheet | | #/2000 cm² | 17 | 14 | 15 | 27 | 17 |
| Stretching success rate | | % | 100 | 100 | 100 | 100 | 100 |
| Tensile strength | MD | kg/cm² | 1250 | 1170 | 1750 | 1420 | 1650 |
| | TD | kg/cm² | 1180 | 1120 | 1570 | 1320 | 1580 |
| Thickness of a film | | μm | 18 | 20 | 21 | 20 | 18 |
| Puncture strength | | N/μm | 0.23 | 0.22 | 0.29 | 0.24 | 0.28 |
| Gas permeability | | $10^{-5}\times$ Darcy | 1.9 | 1.9 | 1.5 | 1.8 | 1.7 |
| Shrinkage | MD | % | 1.6 | 1.8 | 4 | 3.2 | 4.6 |
| | TD | % | 1.2 | 1.2 | 3.6 | 2 | 3.6 |

TABLE 3

Comparative Examples

| Production condition | | Unit | 1 | 2 | 3 | 4 | 5 |
|---|---|---|---|---|---|---|---|
| High density polyethylene (component I) | Mw | g/mol | $1.8 \times 10^5$ | $2.1 \times 10^5$ | $5.7 \times 10^5$ | $4.7 \times 10^5$ | $4.7 \times 10^5$ |
| | Mw $\leq 10^4$ | Wt % | 22 | 15 | 9 | 1.2 | 1.2 |
| | Comonomer | Wt % | 0.5 | 1.5 | 0.8 | 0 | 0 |
| | Content | Wt % | 30 | 30 | 30 | 60 | 13 |
| Paraffin oil (component II) | Viscosity(40° C.) | cSt | 95 | 95 | 95 | 95 | 95 |
| | Content | Wt % | 70 | 70 | 70 | 40 | 87 |
| Stretching | Temperature | ° C. | 114.5 | 114 | 114.5 | 120 | 112 |
| | Melting of a crystalline portion | Wt % | 30 | 30 | 30 | 30 | 30 |
| | Ratio(MD × TD) | Times | 6 × 6 | 6 × 6 | 6 × 6 | 6 × 6 | 6 × 6 |
| | Speed | m/min | 2 | 2 | 2 | 2 | 2 |
| Heat-setting | Temperature | ° C. | 119 | 118 | 119 | 120 | 120 |
| | Melting of a crystalline portion | Wt % | 20 | 20 | 20 | 20 | 20 |
| | Time | min | 15 | 15 | 15 | 15 | 15 |
| The number of gels in a sheet | | #/2000 cm² | 15 | 12 | 75 | 15 | 150 |
| Stretching success rate | | % | 100 | 100 | 60 | 40 | 100 |
| Tensile strength | MD | kg/cm² | 980 | 950 | 1480 | 1770 | 1070 |
| | TD | kg/cm² | 800 | 850 | 1350 | 1650 | 830 |
| Thickness of a film | | μm | 20 | 20 | 19 | 20 | 19 |
| Puncture strength | | N/μm | 0.15 | 0.16 | 0.27 | 0.27 | 0.16 |
| Gas permeability | | $10^{-5}$ × Darcy | 0.8 | 0.9 | 0.8 | 0.2 | 2 |
| Shrinkage | MD | % | 2.8 | 2.4 | 4.7 | 7.5 | 3.3 |
| | TD | % | 2.2 | 1.6 | 3.3 | 5.5 | 2.7 |

TABLE 4

Comparative examples

| Production condition | | Unit | 6 | 7 | 8 | 9 | 10 |
|---|---|---|---|---|---|---|---|
| High density polyethylene (component I) | Mw | g/mol | $4.7 \times 10^5$ | $4.7 \times 10^5$ | $5.1 \times 10^5$ | $5.1 \times 10^5$ | $4.7 \times 10^5$ |
| | Mw $\leq 10^4$ | Wt % | 1.2 | 1.2 | 9.4 | 9.4 | 1.2 |
| | Comonomer | Wt % | 0 | 0 | 0 | 0 | 0 |
| | Content | Wt % | 30 | 30 | 30 | 30 | 30 |
| Paraffin oil (component II) | Viscosity(40° C.) | cSt | 95 | 95 | 95 | 95 | 95 |
| | Content | Wt % | 70 | 70 | 70 | 70 | 70 |
| Stretching | Temperature | ° C. | 110 | 125 | 115 | 115 | 117 |
| | Melting of a crystalline portion | Wt % | 5 | 85 | 30 | 30 | 40 |
| | Ratio(MD × TD) | Times | 6 × 6 | 6 × 6 | 4 × 4 | 7.5 × 7.5 | 6 × 6 |
| | Speed | m/min | 2 | 2 | 2 | 2 | 2 |
| Heat-setting | Temperature | ° C. | 120 | 120 | 120 | 120 | 127 |
| | Melting of a crystalline portion | wt % | 20 | 20 | 20 | 20 | 35 |
| | Time | min | 15 | 15 | 15 | 15 | 15 |
| The number of gels in a sheet | | #/2000 cm² | 17 | 17 | 45 | 45 | 17 |
| Stretching success rate | | % | 20 | 20 | 100 | 60 | 100 |
| Tensile strength | MD | kg/cm² | 1730 | 700 | 1040 | 1570 | 1620 |
| | TD | kg/cm² | 1570 | 650 | 890 | 1320 | 1420 |
| Thickness of a film | | μm | 19 | 20 | 21 | 22 | 18 |
| Puncture strength | | N/μm | 0.26 | 0.12 | 0.14 | 0.26 | 0.23 |
| Gas permeability | | $10^{-5}$ × Darcy | 0.4 | 1.7 | 0.9 | 0.9 | 0.2 |
| Shrinkage | MD | % | 6.6 | 1.6 | 2.6 | 6 | 0.6 |
| | TD | % | 4.8 | 0.4 | 1.8 | 5.6 | 0.4 |

As described in the Tables 1-4, the present invention is advantageous in that extrusion and stretching processes are easily conducted, and thus, it is possible to stably produce a microporous high density polyethylene film of the present invention and the productivity is improved, and that since the microporous film has the excellent gas permeability, tensile strength and puncture strength, and low shrinkage, it can be usefully applied to a battery separator and various filters.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method of producing a microporous high density polyethylene film, comprising:

(a) melt-extruding a composition, including 20-50 wt % high density polyethylene with a weight average molecular weight of $2 \times 10^5$-$5 \times 10^5$ (component I), containing 5 wt % or less molecule with a molecular weight of $1\times10^4$ or less; and 80-50 wt % diluent (component II); to form a sheet;

(b) stretching the sheet at a temperature range, where 30-80 wt % of a crystalline portion of the sheet is molten, according to a tenter-type simultaneous stretching manner such that stretching ratios are 3 times or more in machine and transverse directions, respectively and a total stretching ratio is 25-50 times to produce a film;

(c) extracting the diluent from the film; and (d) heat-setting the resulting film at a temperature range where 10-30 wt % of a crystalline portion of the film is molten, the microporous high density polyethylene film having tensile strengths of 1,100 kg/cm² or more in transverse and machine directions respectively, a puncture strength of 0.22 N/μm or more, a gas permeability (Darcy's permeability constant) of $1.3\times10^{-5}$ Darcy or more, and shrinkages of 5% or less in transverse and machine directions, respectively.

2. The method as set forth in claim 1, wherein the component I contains 2 wt % or less comonomer, the comonomer being selected from the group consisting of propylene, butene-1, hexene-1, and 4-methylpentene-1.

3. The method as set forth in claim 1, wherein the component II includes a paraffin oil with a kinetic viscosity of 20-200 cSt at 40° C.

4. The method as set forth in claim 1, wherein a content of the diluent remaining in the film is 1 wt % or less in the step of (c).

5. The method as set forth in claim 4, wherein a heat-setting time is 1-20 min in the step of (d).

* * * * *